Dec. 27, 1955   P. J. LOUZECKY ET AL   2,728,331
ENGINE LUBRICATION AND PISTON COOLING
Filed Jan. 2, 1952   2 Sheets-Sheet 2

INVENTORS
Paul J. Louzecky &
Orne J. Hovde
BY Willits, Helmig & Baillio
ATTORNEYS

United States Patent Office 2,728,331
Patented Dec. 27, 1955

2,728,331

ENGINE LUBRICATION AND PISTON COOLING

Paul J. Louzecky, Lakewood, and Arne J. Hovde, Fairview Park, Ohio, assignors to General Motors Corporation, Detroit, Mich., a corporation of Delaware Application January 2, 1952, Serial No. 264,544

8 Claims. (Cl. 123—41.38)

This invention relates to internal combustion engines of the multi-cylinder radial type and particularly to lubricating systems therefor.

In such engines, particularly those having the pistons of the radially disposed cylinders linked to a common crankpin of the engine crankshaft by means of connecting rods with slipper ends retained in circumferentially spaced relation about the crankpin, it has heretofore been proposed to effect lubrication of the crankpin and slipper retaining means by conducting lubricating oil thereto through drilled passages provided in the crankshaft, such passages terminating at the periphery of the crankpin from which oil is alternately directed against the slipper bearing surfaces and between the adjacent slippers to the slipper retaining means. Some attempts have been made in such engine constructions to also conduct oil through the connecting rods for lubricating the wrist pins and supplying oil for cooling purposes to the interiors of the engine pistons above the wrist pins. Such attempts, particularly with respect to obtaining sufficient oil delivery for piston cooling however have not been generally successful using oil supply pressures of reasonable values, apparently on account of the large proportion of the available oil supply at the crankpin periphery escaping between the connecting rod slippers, and to accomplish the necessary oil flow to the piston it has been found necessary to provide separate oil jets for the purpose.

In the present invention the added flow through the connecting rods to obviate the need for such jet pipes or equivalent devices has been accomplished by an improved arrangement of oil passages in the crankshaft and the connecting rod slippers which takes advantage of the maximum centrifugal pumping and inertia action of the crankthrow and connecting rods and avoids escape of excessive oil between the connecting rod slippers. The invention further provides novel means for introducing lubricating oil to the crankshaft journals adjacent respective crankpins of multi-row engines of the aforesaid type, whereby oil in adequate quantities is uniformly distributed to each crankpin and its associated connecting rods and pistons.

The means by which these and other advantages of the invention are carried out will now be described having reference to the drawings which illustrate a specific illustrative embodiment, in which.

Figure 1:
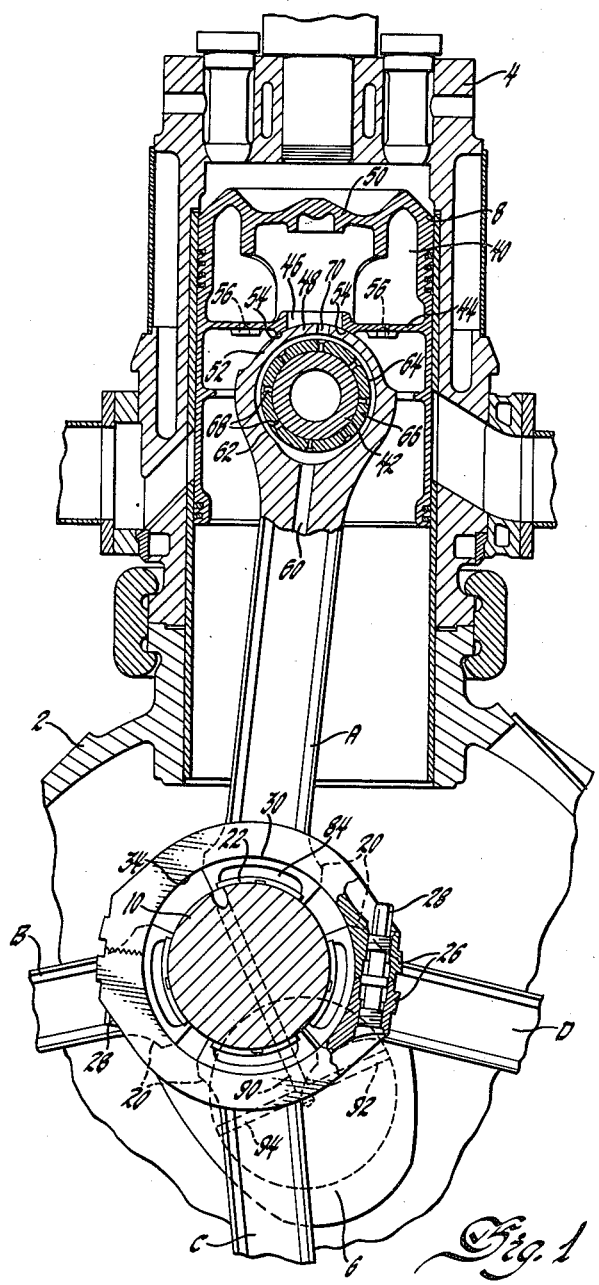
Figure 1 is a fragmentary transverse view through a portion of a two-stroke radial internal combustion engine, with parts broken away and in section.

Referring to the drawings in detail, the engine as shown in Figure 1 has a crankcase 2 with a row of cylinders 4 extending radially thereof about the engine crankshaft 6. Only one cylinder 4 is shown since it will be understood the others are duplicates thereof. Each cylinder is fitted with a piston 8 which is connected to a common crankpin 10 of the crankshaft 6 by respective connecting rods A-D.

Figure 2:
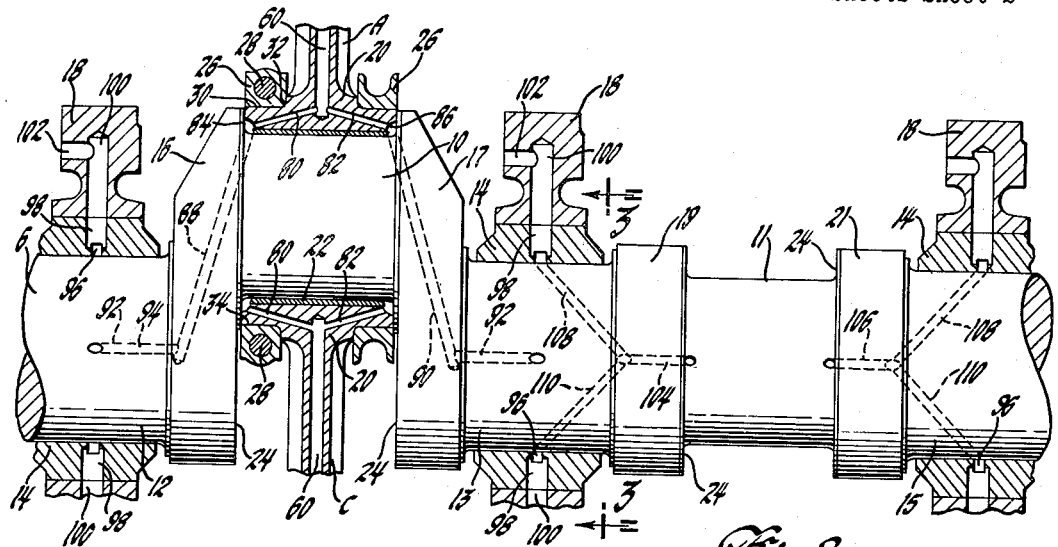
Figure 2 is a longitudinal view of a portion of the crankshaft, connecting rods and main bearings for a multi-row engine similar to Figure 1, with parts broken away and in section.
Figure 3:
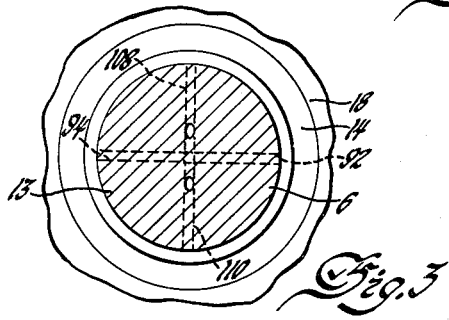
Figure 3 is a detail sectional view taken substantially on line 3—3 of Figure 2.

As shown in Figure 2, the crankshaft 6 which may have one or more additional crankpins 11, each similarly associated with a row of cylinders, has a main journal portion 12 supported in a bearing block 14 and connected to its adjacent end of the crankpin 10 by a crank cheek 16. As is conventional in engines having such a plurality of rows of cylinders the crankshaft may have additional journal portions 13 and 15, each supported in a bearing block 14 and connected to the nearest adjacent crankpin by respective crank cheeks 17, 19 and 21. In Figure 2, the members 18 which surround the main bearing blocks 14 are suitably mounted to the crankcase for radially supporting the crankshaft therein.

Each of the respective connecting rods A-D terminates at its inner end with a slipper portion 20 of arcuate shape to fit the cylindrical periphery of the crankpin and may be lined on its crankpin bearing surface with a suitable layer or insert 22 of antifriction material. Each slipper 20 and its bearing insert 22 extends a sufficient distance circumferentially about the crankpin to carry the necessary piston loading pressures, and the number of such slippers which can be operatively connected to the same crankpin is limited both by the bearing pressures which must be imposed thereon and the necessity for the slippers to have freedom for relative circumferential movement about the crankpin during each rotating cycle of the crankshaft. Each crank cheek has its face 24 opposite the adjacent end of the crankpin forming a shoulder which laterally supports and closely embraces the several slippers.

Suitable means is provided for retaining the slippers journaled to the crankpin. As shown in Figures 1 and 2, this means is in the form of split annular rings 26, the abutting ends of which are locked together as by suitable threaded fasteners 28. The rings 26 rotatably journal on cylindrical seating surfaces 30 provided therefor on the outer periphery of the slippers, and are retained against movement axially of the slippers by shoulders 32 formed along the inboard margins of said surfaces 30 and by the crank cheek surfaces 24. Suitable anti-friction material (not shown) may be applied either to the inner peripheral surfaces 34 of the rings, or to the slipper surfaces 30, as desired. Although not shown it will be understood that each additional crankpin 11 of a multi-row engine will be similarly fitted with connecting rods and slippers, these parts being shown associated only with crankpin 10 in Figure 2 to avoid duplication of illustration.

Referring particularly to Figure 1 of the drawings, the piston 8 (one of which it will be understood is connected to each of the rods A-D) has an oil cooling chamber 40 above the wrist pin 42. The lower wall 44 of this chamber 40 has a central opening 46 opposite the upper end 48 of the connecting rod, through which opening oil enters the chamber 40 for cooling the underside of the piston crown 50. In the particular arrangement shown, the upper end 48 of the connecting rod partially enters the opening 46 and is provided with a cylindrical surface 52 concentric with the axis of the piston pin 42 and having a close fit with the underside of the wall 44, and to further carry out this close fitting relationship the underside of the wall 44 may be provided with concave surfaces 54 at the opposite sides of the opening 46. Oil which is directed into the chamber 40 is permitted to escape therefrom through suitable openings such as are shown provided at 56 in the wall 44.

Each connecting rod has a passage 60 extending longitudinally thereof from its slipper portion 20. This passage branches into two diametrically opposite semi-annular recesses 62 and 64 encircling the wrist pin bushing 66. A plurality of radial openings 68 provided in the bushing 66 serve to conduct oil to the wrist pin from these recesses 62 and 64. 70 indicates the upper continuation of the passage 60 by which the oil enters the piston chamber opening 46 from the branch recesses 62 and 64. It will thus be seen that oil flowing up the passage 60 effects both the lubrication of the wrist pin and oil cooling of the upper portion of the piston.

As seen in Figure 2, the lower end of each longitudinal connecting rod passage 60 intersects at the juncture of two passages 80 and 82 which extend inwardly toward each other from respective pockets or recesses 84 and 86 formed in the opposite end portions of each slipper 20. These recesses are circumferentially elongated, as seen in Figure 1, and cooperate with their adjacent crank cheek surfaces 24 and the periphery of the crankpin to form substantially closed oil receiving chambers, into which oil is periodically conducted from the axis of the crankshaft by means of passageways 88 and 90 extending through the cheeks 16 and 17. In order that the maximum centrifugal pumping effect of the crankshaft be utilized for this purpose, the passages 88 and 90 terminate on the portion of the crankpin periphery most remote from the crankshaft axis. Oil is fed to the inner ends of passages 88 and 90 by means of two intersecting passages 92 and 94 extending from diametrically opposite sides of the respective journals 12 and 13 and communicating at the journal periphery with annular grooves 96 formed in the bearing blocks 14. The grooves 96 are in turn supplied by one or more radial passages 98 provided in the bearing blocks 14 and communicating with suitable passages 100 and 102 provided in the bearing support members 18.

Similarly the crankpin 11 has the portions of its periphery most remote from the crankshaft axis and adjacent the cheeks 19 and 21 connected by passages 104 and 106 extending diagonally through the cheeks 19 and 21 to the crankshaft axis, and the inner ends of these passages 104 and 106 are connected to the periphery of the crankshaft journals 13 and 15 by intersecting passages 108 and 110 extending from diametrically opposite sides of the journals 13 and 15. The passages 108 and 110 it will be noted lie in a plane at right angles to the plane of the passages 92 and 94.

Alternatively, to simplify drilling the crankshaft, the passages 92 and 110 could be omitted, providing the passages 94 and 108 are made of sufficient size to handle the necessary oil flow to the crank cheek passages; and it would be preferable in such event that the outer end of each passage 94 be located on the diametrically opposite side of the main journal from that of its associated passage 110.

During engine operation, with oil supplied to the passages 102 of each main bearing carrier member 18, a continuous flow of oil is delivered through each of the passages 88, 90, 104 and 106 to the periphery of each crankpin opposite its adjacent crank cheek. As the slippers 20 of the connecting rods rotate about the crankpins they successively and alternately cover and expose the outer ends of these passages. During the periods when the passages are thus uncovered the lubricating oil is thrown outward against the underside of the slipper retaining rings 26 and effects the lubrication of these retaining rings and their cooperating bearing surfaces on the crank cheeks and slippers. During the periods, in turn, when the passages are covered by the slippers the oil flows into the chambers formed by the recesses 84 and 86, from whence it passes through the slipper passages 80 and 82 to "fill" the connecting rod passages 60.

The circumferential elongation of the recesses 84 and 86 is made symmetrical with the top dead center position of each rod A–D, respectively, in order that the "filling" of the connecting rod passages 60 shall occur during the last part of the approach of each connecting rod toward its top dead center position and during the initial portion of its return from this position. The effect thereby obtained is the utilization to the fullest extent of both the centrifugal and inertia forces acting on the oil in the various passages during each crankshaft rotation, and the resultant delivery of oil in sufficient volume into the cooling chamber 40 of each piston 8.

Figure 4:
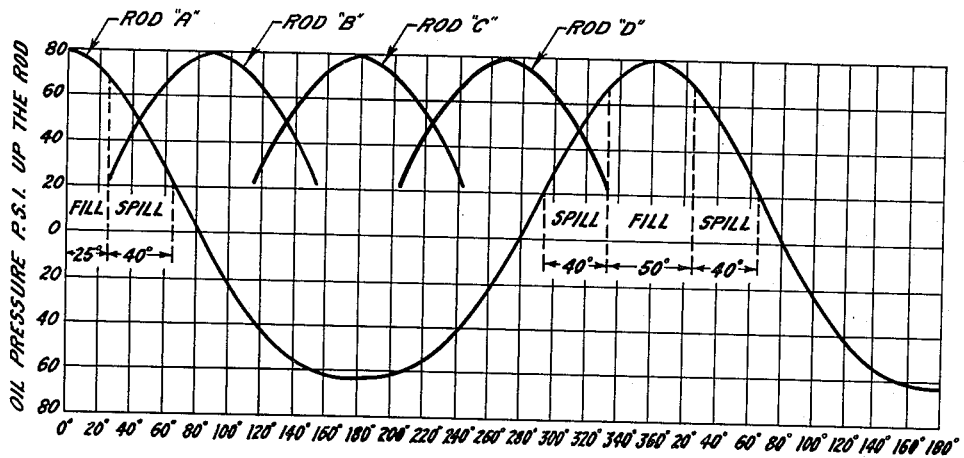
Figure 4 is a diagram showing the cumulative effect of centrifugal and inertia forces on the oil in the connecting rod longitudinal passages during the crankshaft rotating cycle, together with the timing of the alternate oil deliveries to such passages and periods of oil escape between adjacent connecting rod slippers.

Figure 4 shows the relative build up of these inertia and centrifugal forces on the oil in the connecting rods during each cycle of rotation of the crankshaft, together with the relative timing of the oil "fill" and intermediate oil "spill" periods for a four-cylinder-per-row engine as has been described. It will be noted from the diagram of Figure 4 that each rod A–D enjoys the same length of oil "fill" (shown as extending from 25° before, through 25° after top dead center), and that the intermediate "spill" periods (during which lubrication of the slipper retaining rings is carried out) occurs during the remaining 40° of crankshaft rotation preceding the start of the "fill" period for the next succeeding connecting rod.

The oil in a hollow connecting rod surges up and down due to the inertia that results from the motion of the rod. If an attempt were made to force oil up the rod against this inertia, excessive oil pressures would be required to overcome the inertia forces and the excessive pressure would result in considerably more oil leakage through the various clearances. In the above arrangement, the centrifugal and inertia forces of the oil are utilized to feed the piston and piston pin, and this is done by drilling the oil hole in the crankshaft so that it registers at the proper time with the slots in the foot of the connecting rod. Figure 4 shows the way the oil surges up and down the rod, and the section marked "fill" on the curve is the period when the crankshaft oil hole registers with the slot in the slipper, so that the oil travels up the rod due to its own rotational and inertia forces.

While the invention has been described in its application to a specific engine structure, such has been done for purposes of illustration only, and it will be understood that various modifications thereof may be made without departing from the spirit and scope of the following claims.

We claim:

1. In a lubricating system for a multi-cylinder radial engine having a crankshaft and a plurality of connecting rods with slipper ends rotatably bearing in circumferentially spaced relation upon a common crankpin of the crankshaft, said crankshaft having an axis of rotation and a journal portion on said axis connected to the crankpin by a crank cheek, said crankshaft having means for conducting lubricant to said slipper ends including a passage extending through said cheek from said axis and intersecting the crankpin periphery most remote from said axis and adjacent the cheek, said cheek having an annular surface forming a shoulder about the adjacent end of the crankpin, said slipper ends each having a circumferentially elongated recess cooperating with said shoulder and the peripheral surface of the crankpin to form a substantially closed chamber communicating with the crankpin end of said passage during only a portion of each rotation of the crankshaft, said recesses being located substantially symmetrical with the top dead center positions of their respective connecting rods, said connecting rods each having a passageway connecting its opposite end with said recess.

2. The invention of claim 1, together with a bearing member surrounding said journal and cooperating with the journal periphery to form a closed annular chamber therebetween intermediate the ends of said journal, said member having a transverse passage terminating in communication with said annular chamber, said means including a duct interconnecting said annular chamber and the crankshaft axis end of said first named passage.

3. In a lubricating system for a multi-cylinder radial engine having a crankshaft and a plurality of connecting rods with slipper ends rotatably bearing in circumferentially spaced relation upon a common crankpin of the crankshaft, said crankshaft having an aixs of rotation and a journal portion on said axis at each side of said crankpin, crank cheeks connecting said journals to the respective adjacent ends of the crankpin and forming shoulders closely embracing said slipper ends, said crankshaft having means for conducting lubricant to said slipper ends including a passage extending through each of said cheeks from said axis and intersecting the adjacent ends of the crankpin periphery most remote from said axis, said slipper ends each having a circumferentially elongated recess adjacent each end of the crankpin, each of said recesses cooperating with the shoulder of its adjacent crank cheek and the periphery of the crankpin to form a substantially closed chamber having communication with its associated crankpin passage only during a portion of each rotation of the crankshaft, said recesses being located substantially symmetrical with the top dead center positions of their respective connecting rods, said connecting rods each having a passageway connecting its opposite end with each of its said recesses.

4. The invention of claim 3, together with bearing members surrounding the respective journals and cooperating therewith to form closed annular chambers intermediate the ends of said journals, means for introducing lubricant to each of said annular chambers, said means including a pair of ducts providing communication between one of said first named passages and its adjacent annular chamber, each said pair of ducts extending in converging relation from diametrically opposite sides of the journal periphery and intersecting its associated first named passage at the crankshaft axis.

5. In a lubricating system for a multi-cylinder radial engine having a crankshaft and a plurality of connecting rods with slipper ends rotatably bearing in circumferentially spaced relation upon a common crankpin of the crankshaft, said crankshaft having an axis of rotation and a journal portion on said axis connected to the crankpin by a crank cheek, said crank cheek and said slippers having opposing surfaces cooperating with each other and the periphery of said crankpin to form individual substantially closed chambers therebetween, said crankshaft having means for successively conducting lubricant to said chambers during respective portions of crankshaft rotation, said means including a passage extending through said cheek from said axis to the crankpin periphery adjacent said cheek and most remote from said axis, and said connecting rods each having a lubricant conducting passageway connecting its opposite end with its associated chamber.

6. In a radial engine, a plurality of cylinders fitted with pistons and arranged in a substantially common plane about an axis, a crankshaft having a journal portion on said axis and a common crankpin connected to said journal portion by a crank cheek, connecting rods linked to the respective pistons and terminating at their opposite ends with slippers journaled in circumferentially spaced relation upon the periphery of said crankpin, retaining means for said slippers, said crankshaft and connecting rods having means for conducting lubricant alternately to said retaining means and to successive pistons in timed relation to crankshaft rotation including a passage extending through said crank cheek from the crankshaft axis to the crankpin periphery most remote from said axis, a circumferentially elongated recess in a portion of the crankpin opposed surface of each slipper having direct communication with said passage during a portion of each crankshaft rotation, and a passageway extending through each connecting rod from its said recess to its piston.

7. In an internal combustion engine or the like, a plurality of cylinders in radially disposed relation, a crankshaft having a main journal and a crankpin with a connecting cheek forming a shoulder at one end of the crankpin, a bearing for said journal having an oil delivery passage and a connecting inwardly facing annular groove formed therein intermediate the journal ends, a pair of converging ducts extending through said journal from diametrically opposite portions of said groove and intersecting within said cheek on the axis of said journal, a duct extending through said cheek from the intersection of said pair of ducts and terminating on the periphery of said crankpin adjacent said shoulder, pistons in said cylinders each having an oil cooling chamber, connecting rods having one of their ends secured to the respective pistons and provided with longitudinally extending passages for conducting oil into said chambers, slippers on the opposite ends of said connecting rods arranged in circumferentially adjacent spaced relation about the crankpin, said slippers each having a passage connected with said longitudinal passage and terminating in a circumferentially elongated recess facing both said shoulder and the adjacent periphery of the crankpin.

8. In combination, a crankshaft having an axis of rotation, a journal portion on said axis and a crankpin fixed to the journal portion, a plurality of connecting rods having slipper end portions journalled in circumferentially spaced relation upon the periphery of the crankpin, said crankpin and each said connecting rod slipper end portion having cooperating surfaces forming an oil receiving chamber therebetween during the portion of each crankshaft rotation when its respective connecting rod is at its top dead center position, said conecting rods each being provided with a passageway leading from its said chamber and said crankshaft having a passageway leading to the crankpin periphery most remote from said axis for successive connection by said chambers with their respective connecting rod passageways during crankshaft rotation.

References Cited in the file of this patent

UNITED STATES PATENTS

| | | |
|---|---|---|
| 1,113,081 | Ziegler | Oct. 6, 1914 |
| 1,672,003 | Smith | June 5, 1928 |
| 1,910,902 | McKone | May 23, 1933 |
| 2,142,175 | Buttner | Jan. 3, 1939 |
| 2,236,401 | Gehres | Mar. 25, 1941 |

FOREIGN PATENTS

| | | |
|---|---|---|
| 503,007 | Great Britain | Mar. 29, 1939 |
| 547,111 | Great Britain | Aug. 13, 1942 |